United States Patent [19]

Tabata et al.

[11] Patent Number: 4,511,172

[45] Date of Patent: Apr. 16, 1985

[54] VEHICLE DOOR HANDLE SEALING SYSTEM

[75] Inventors: Masaaki Tabata, Susono; Katsuyuki Miyabayashi, Toyota, both of Japan

[73] Assignee: Toyota Jidosha Kabushiki Kaisha, Japan

[21] Appl. No.: 504,949

[22] Filed: Jun. 16, 1983

[30] Foreign Application Priority Data

Nov. 1, 1982 [JP] Japan .......................... 57-166070[U]

[51] Int. Cl.$^3$ .............................................. B60J 5/04

[52] U.S. Cl. ..................................... 296/146; 49/394; 292/336.3

[58] Field of Search .................. 296/146, 213; 49/394, 49/502, 503; 292/336.3, 347, DIG. 23

[56] References Cited

U.S. PATENT DOCUMENTS 4,358,153 11/1982 Iwata .................................. 296/213

FOREIGN PATENT DOCUMENTS 167822 10/1982 Japan .................................. 296/146

*Primary Examiner*—Robert R. Song

*Attorney, Agent, or Firm*—Parkhurst & Oliff

[57] ABSTRACT

A vehicle body structure for preventing water flow into the interior of a vehicle door. The structure comprises an upstanding seal installed between an outer door panel and a door handle case, enveloping an aperture around the door handle.

9 Claims, 5 Drawing Figures

VEHICLE DOOR HANDLE SEALING SYSTEM

BACKGROUND OF THE INVENTION

The present invention relates to a vehicle body structure for preventing water flow into the interior of a vehicle body, and more particularly to a structure which provides a protective cover for preventing water flow into the inside of the vehicle body through an aperture around a door handle.

In a vehicle, a door handle is typically provided on each door for opening and closing by a passenger's operation.

Heretofore, an aperture has been defined between the door handle and an outer door panel forming the outer face of the door. The conventional vehicle body structure is disclosed in FIGS. 2 and 4 which are indicated to be prior art.

As apparent from FIG. 2, an aperture 20A is defined between the lower part of the door handle 3 and the edge of the outer door panel 1. When a vehicle is driven during rainy weather conditions, or washed, water may flow into the inside of the vehicle body through the aperture 20A. Usually, a door lock device L is installed within the door body for locking and unlocking the door. The lock device may be contacted by water which flows into the interior of the door. After the vehicle is parked for a long time outdoors at very low temperatures, as are common during the winter season, the water in the door lock device L may become frozen. This may cause the door lock device L to be at least temporarily inoperable.

SUMMARY OF THE INVENTION

The present invention was made in view of the above background and to overcome the above-discussed drawbacks. It is accordingly an object of the invention to provide vehicle door handle structures which prevents the flow of water into the interior of a vehicle body.

To attain the above objects, a vehicle body and door handle structure according to the present invention, comprises:

an outer door panel forming an outer face of a vehicle door and having an opening therein;

a door panel case installed in the opening in the outer door panel;

a door handle pivotally mounted in the door handle case for being pivotally moved for opening of the door by a passenger, and defining an aperture between the outer door panel and said door handle;

an upstanding seal member installed between the outer door panel and the door handle, the seal member covering the aperture thereby preventing water flow into the interior of the door.

BRIEF DESCRIPTION OF THE DRAWINGS

The above objects, features and advantages of the present invention will become more apparent from reading the following description of the preferred embodiments taken in connection with the accompanying drawings, wherein.

DETAILED DESCRIPTION OF THE PREFERRED EMBODIMENTS

The present invention will be described in detail with reference to the accompanying drawings which illustrate different forms of a vehicle body structure according to the present invention.

Figure 1:
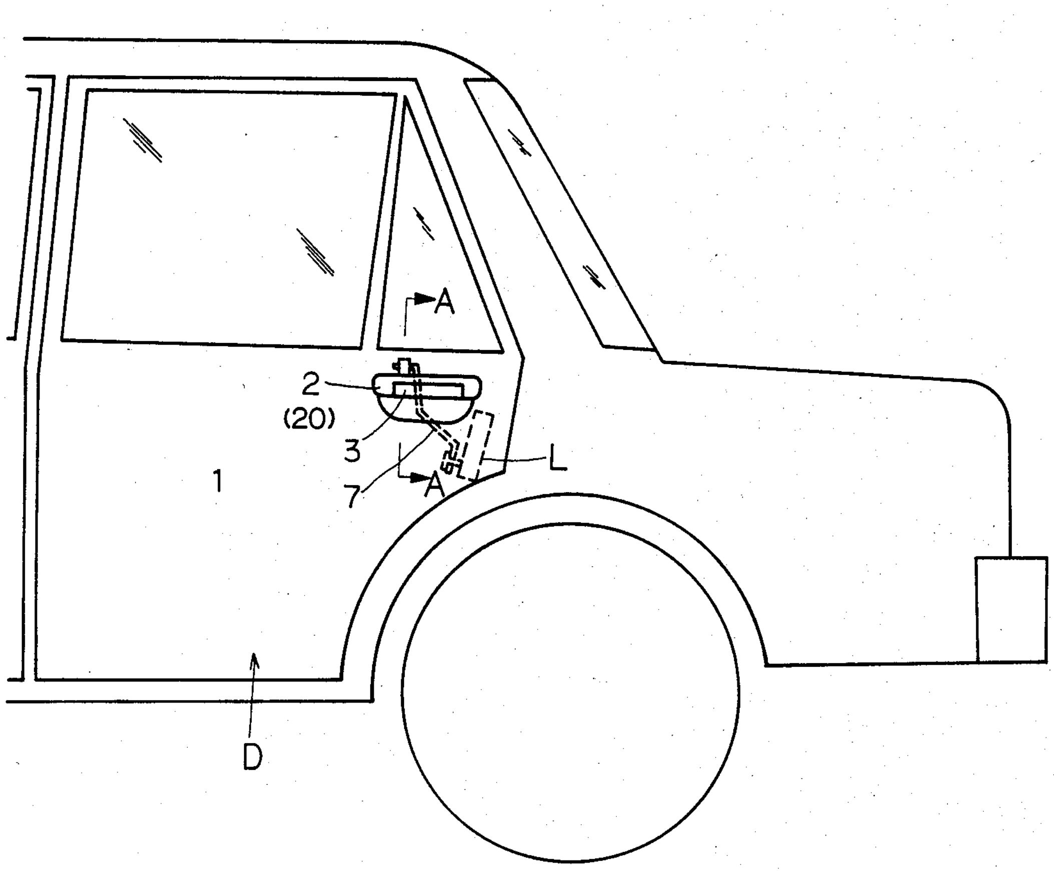
FIG. 1 is a side elevation, partial cross-section view, of the left rear of a vehicle body.
Figure 2:
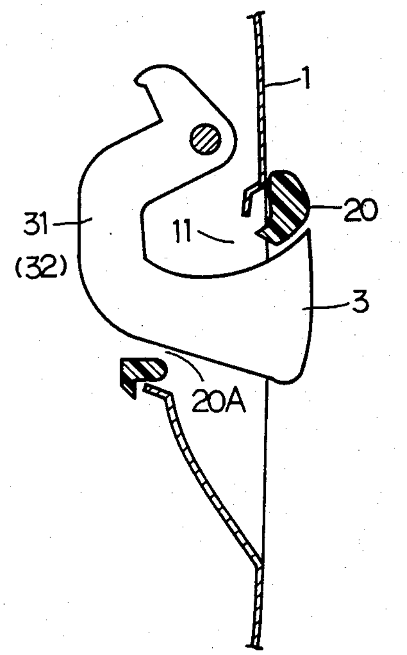
Fig. 2 PRIOR ART
FIG. 2 is a cross-sectional view taken along line A—A of FIG. 1, but showing prior seal structure.

Referring first to FIG. 1, a vehicle door D comprising an outer door panel 1 is swingably mounted to be opened and closed for permitting passengers to get in and out of the vehicle. To open the door, one lifts door handle 3 pivotally mounted in door handle case 2 (20). The door handle case 2 (20) is provided in an opening 11 in the outer door panel 1 and connected with a door lock device L through a link 7.

Figure 3:
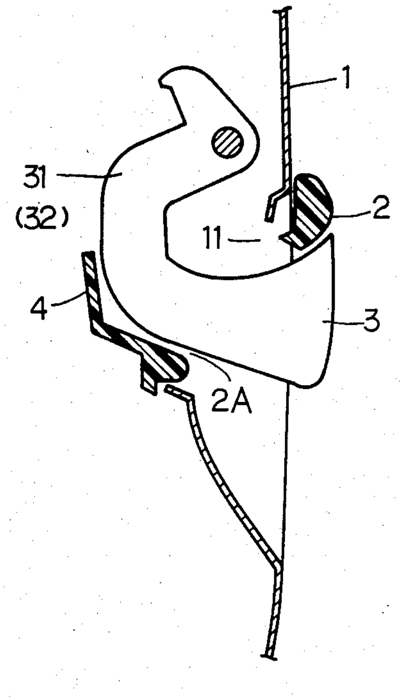
FIG. 3 is a cross-sectional view taken along line A—A of FIG. 1, according to a first embodiment of the present invention.
Figure 4:
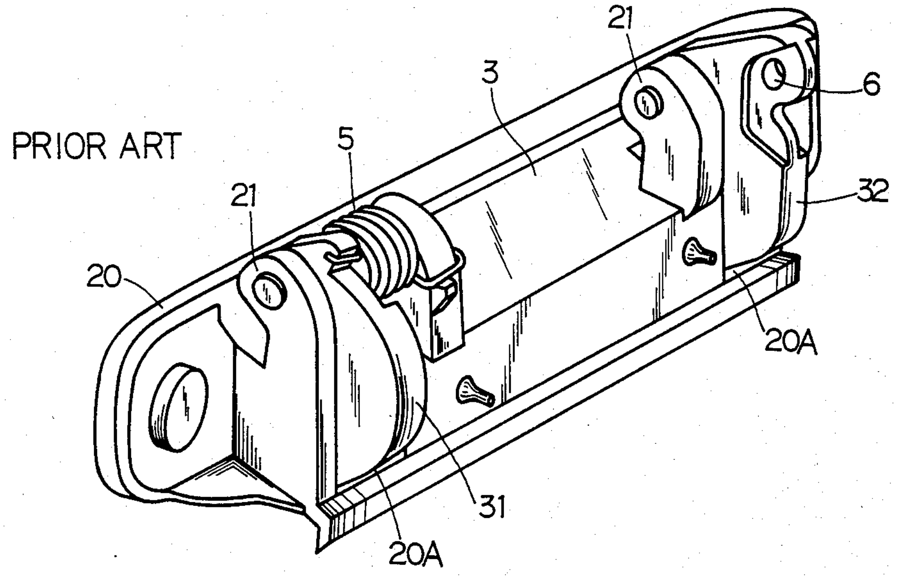
FIG. 4 is a perspective view showing known prior seal structure.
Figure 5:
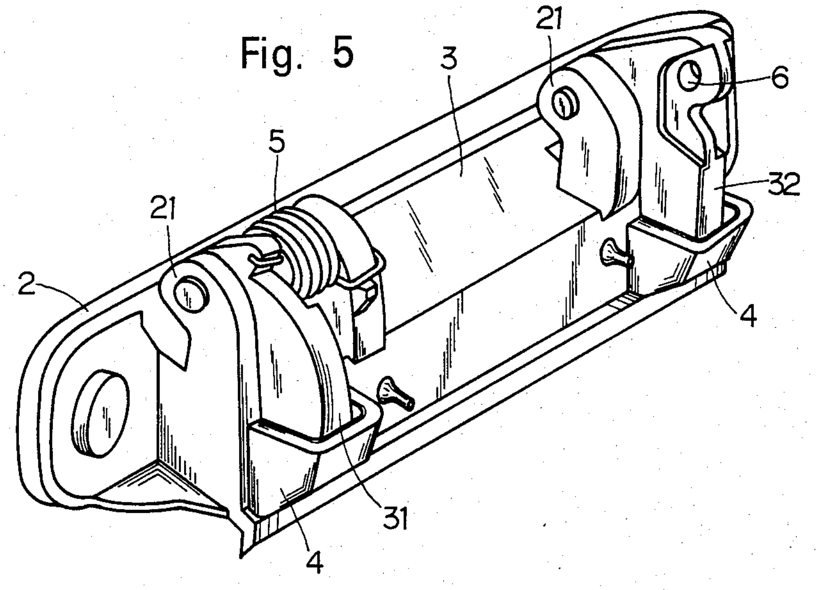
FIG. 5 is a perspective view illustrating the present invention.

Referring next to FIG. 3, there is illustrated a cross-sectional view of a first embodiment of the present invention taken along line A—A of FIG. 1. The outer door panel 1 extends downwardly and includes the opening 11 in which the door handle case 2 is mounted. With the door handle case 2, the door handle 3 for opening and closing the door is pivotally mounted on coaxial shaft stubs. The outer portion of the door handle 3 is substantially parallel to the outer door panel 1, and the inner portion of the door handle 3 includes arms 31,32 which are separately located at opposite ends of the outer portion of the door handle 3 as shown in FIGS. 4 and 5 and are substantially perpendicular to a plane of the outer portion of the door handle member 3. A seal 4 is provided in aperture 2A between the door handle 3 and the outer door panel 1. The upstanding seal 4 substantially encapsulates a bottom portion of each respective arm 31, 32 of the door handle 3 and covers the lower part of the aperture 2A, thereby preventing water from flowing into the interior of the door. In this embodiment, the seal 4 is made of plastic.

In other embodiments, the material of the upstanding seal 4 is resilient rubber, and the rubber may be adhered to the inner face of the door handle case 2.

Next, FIG. 5 illustrates a perspective view of the present invention. The door handle case 2 is secured to the vehicle body through a support pillar 21 fixed to the vehicle body. The door handle 3 is always biased by a torsion coil spring 5 in the latching direction. FIG. 5 illustrates a condition wherein door handle 3 is closed by the biasing force of the torsion coil spring 5. An arm 32 has a hole 6 receiving link 7 connected with the door lock device L. When a passenger lifts the door handle 3 against the biasing force of the torsion coil spring 5 for entering the vehicle, the door handle 3 is rotated upwardly and the movement of the rotation is transmitted to the door lock device L by the link 7. The upstanding seal 4 covers the lower portions of the arms 31,32. Therefore, even if some small amount of water does enter into the interior of the door through aperture 2A, the water is returned outwards by the protector 4. As a result, water does not enter into the interior of the door D.

While the present invention has been described in its preferred embodiments, it is to be understood that the invention is not limited thereto but may be otherwise embodied within the scope of the following claims.

What is claimed is:

1. A vehicle body structure for preventing entry of water into the interior of a vehicle door, comprising:

an outer door panel forming an outer face of a vehicle door and having an opening therein;

a door handle case mounted in said opening in the outer door panel;

a door handle member having an outer portion substantially parallel to said outer door panel and an inner portion substantially perpendicular to said outer portion, said inner portion including a first arm mounted at a first end of said outer portion of said door handle member and a second arm mounted at an opposite second end of said outer portion of said door handle member, and said first and said second arms are pivotally mounted in said door handle case, thereby manipulating the door to open and close, whereby a first aperture exists between the outer door panel and the first arm member and a second aperture exists between the outer door panel and the second arm member; and a first sealing member is installed between the outer door panel and the first arm and a second sealing member is installed between the outer door panel and the second arm, such that each sealing member extends parallel to each respective arm and each sealing member substantially encapsulates a bottom portion of each respective arm, thereby covering said aperture and preventing water from flowing into the interior of said door.

2. The vehicle body structure of claim 1, wherein said seal is made of plastic.

3. The vehicle body structure of claim 1, wherein said seal is made of resilient rubber.

4. The vehicle body structure of claim 1, wherein said door handle is constantly biased in the latching direction by a torsion coil spring.

5. The vehicle structure of claim 4, wherein an end of said torsion coil spring is fixed to said first arm.

6. The vehicle body structure of claim 1, wherein a door lock device is mounted in said door.

7. The vehicle body structure of claim 6, wherein a connection means connects said door handle with said door lock device.

8. The vehicle body structure of claim 7, wherein said connection means is at least one link member.

9. The vehicle body structure of claim 8, wherein said connection means connects to said second arm.

* * * * *